(12) United States Patent
Haba

(10) Patent No.: US 7,511,415 B2
(45) Date of Patent: Mar. 31, 2009

(54) BACKLIGHT FOR LIQUID CRYSTAL DISPLAY DEVICE

(75) Inventor: Masanori Haba, Tokyo (JP)

(73) Assignee: Dialight Japan Co., Ltd., Osaka (JP)

( * ) Notice: Subject to any disclaimer, the term of this patent is extended or adjusted under 35 U.S.C. 154(b) by 363 days.

(21) Appl. No.: 11/076,949

(22) Filed: Mar. 11, 2005

(65) Prior Publication Data
US 2006/0044491 A1   Mar. 2, 2006

(30) Foreign Application Priority Data
Aug. 26, 2004   (JP) .............................. 2004-247208

(51) Int. Cl.
*H01J 1/62* (2006.01)

(52) U.S. Cl. .................. 313/497; 313/495; 313/311; 313/285; 313/333; 349/61

(58) Field of Classification Search .................. 349/61; 313/251, 294, 285, 333, 495–497, 309–311, 313/351, 346 R, 336, 306
See application file for complete search history.

(56) References Cited

U.S. PATENT DOCUMENTS

| 5,248,917 | A |   | 9/1993 | Hamagishi et al. |
| 5,440,200 | A |   | 8/1995 | Ozawa |
| 5,600,200 | A | * | 2/1997 | Kumar et al. ........... 313/346 R |
| 5,760,858 | A |   | 6/1998 | Hodson et al. |
| 5,831,397 | A | * | 11/1998 | Stevens et al. .............. 315/366 |
| 5,967,873 | A | * | 10/1999 | Rabinowitz .................. 445/50 |
| 6,346,775 | B1 |   | 2/2002 | Lee et al. |
| 7,193,357 | B2 | * | 3/2007 | Choi et al. .................. 313/495 |

| 2001/0015605 | A1 | * | 8/2001 | Yoshiki ...................... 313/310 |
| 2004/0061429 | A1 |   | 4/2004 | Sakai et al. |
| 2004/0150323 | A1 | * | 8/2004 | Yonezawa et al. ........... 313/495 |

(Continued)

FOREIGN PATENT DOCUMENTS

EP    0 529 090 A1   3/1992

(Continued)

OTHER PUBLICATIONS

Lee N S et al: "Application of carbon nanotubes to field emission displays" Diamond And Related Materials, Elsevier Science Publishers Amsterdam, Nl, vol. 10, No. 2, Feb. 2001 (2001-02), pp. 266-270, XP004322369 ISSN: 0925-9635.

*Primary Examiner*—Peter Macchiarolo
(74) *Attorney, Agent, or Firm*—McDermott Will & Emery LLP

(57) ABSTRACT

A backlight 23 of the present invention has a panel case 24 and plural phosphor-coated anode sections 25 each arranged flatly in the panel case and plural linear cathode sections 26. Each of the plural linear cathode sections 26 has a conductive wire 33 having a great number of field concentration assisting concave/convex sections 34 formed on its outer peripheral surface and a carbon-based film 35 having, as a field electron emitter, a great number of sharp microscopic sections on the field concentration assisting concave/convex sections 34, wherein the field electron emitter emits electrons toward each of the plural phosphor-coated anode sections 25 so as to be radially widespread, when DC voltage is applied between the phosphor-coated anode sections 25 and the linear cathode sections 26.

6 Claims, 4 Drawing Sheets

U.S. PATENT DOCUMENTS

2005/0275329 A1* 12/2005 Hiraki et al. .................. 313/310
2006/0043860 A1* 3/2006 Haba .......................... 313/310

FOREIGN PATENT DOCUMENTS

| | | |
|---|---|---|
| EP | 1 122 759 A2 | 8/2001 |
| JP | 6-242439 | 9/1994 |
| JP | 2001-312953 | 11/2001 |
| JP | 2002-42735 | 2/2002 |
| JP | 2004-227781 | 8/2004 |
| WO | WO 9944215 A * | 9/1999 |
| WO | WO 03/088308 A1 | 10/2003 |

* cited by examiner

BACKLIGHT FOR LIQUID CRYSTAL DISPLAY DEVICE

BACKGROUND OF THE INVENTION

1. Field of the Invention

The present invention relates to a backlight for a liquid crystal display device.

2. Description of the Prior Arts

A liquid crystal display device has recently been used as a display device for a wide variety of electronic devices such as a television set, portable terminal, personal computer, electronic notebook and camera-integrated VTR, since it has a thin size, light weight and reduced power consumption. Different from a Brown tube or plasma display, the liquid crystal display device does not emit light but it displays an image or the like by controlling a quantity of light incident from the outside. In such a liquid crystal display device, a backlight for a liquid crystal display device for lighting the liquid crystal display device is provided on its backside (see Japanese Unexamined Patent Application No. 6-242439).

In a circumstance that reduced power consumption has been regarded as important in the aforesaid electronic devices, it has been said that the backlight for a liquid crystal display device holds about a half of the total power consumption of the aforesaid electronic devices. Consequently, it is important to reduce power consumption of the backlight for a liquid crystal display device. On the other hand, a demand for reducing power consumption of the backlight for a liquid crystal display device has been more and more increased when a size of a display screen of a liquid crystal television set, for example, has been increased. In view of the technical background of the backlight for a liquid crystal display device, the inventor has intended to reduce power consumption of the backlight for a liquid crystal display device and simultaneously has made an earnest study of a backlight for a liquid crystal display device that can light a liquid crystal display device with high intensity.

A backlight for a liquid crystal display device uses a cold cathode tube. Its required brightness is 10,000 cd/m$^2$ in a typical backlight for a liquid crystal display device. In order to obtain this required brightness regardless of the screen size, an arrangement of a so-called directly-below type has to be adopted wherein an arc tube is arranged immediately below the backside face of the liquid crystal display device, since the required brightness cannot be obtained by a so-called edge-light type backlight wherein an arc tube (cold cathode tube) is arranged at the side face of the liquid crystal display device for lighting the liquid crystal display device by using a reflection plate, light-guiding plate, diffusion sheet, prism sheet or the like. FIG. 7 and FIG. 8 respectively show a backlight of edge-light type and directly-below type. In FIG. 7, numeral 9 denotes a reflector, 10 a cold cathode tube (arc tube), 11 a reflection plate, 12 a light-guiding plate, 13 a diffusion sheet and 14 a prism sheet. In FIG. 8, numeral 15 denotes cold cathode tubes, 16 a reflection plate, 17 a diffusion plate, 18 a diffusion sheet and 19 a prism sheet.

In the directly-below arrangement, plural straight-tube type arc tubes are arranged in lines or arc tubes are meanderingly arranged. However, even in the directly-below type backlight, the luminous brightness of the arc tube itself is low, so that a large quantity of luminous power is still consumed in order to obtain the required brightness. Further, it is necessary to increase the installation density of the arc tube or increase its number to be arranged in order to obtain the required brightness involved with the increased size of the liquid crystal television set. Therefore, power consumption has been rapidly increased.

Moreover, there are many components to compose the backlight since it is required to provide the diffusion sheet or diffusion plate for diffusing the emission of light in both the edge-light type backlight and the directly-below type backlight, thereby entailing a disadvantage of increasing production cost.

The present invention is accomplished in view of the technical background of the conventional backlight for a liquid crystal display device. The subject that should be solved by the present invention is to provide with low cost a backlight for a flat panel liquid crystal display device wherein the number of components such as a costly diffusion sheet required in the edge-light type or directly-below type is reduced, to thereby be capable of lighting the liquid crystal display device in a plane manner without non-uniformity in illumination with reduced power consumption and high luminous brightness.

SUMMARY OF THE INVENTION

A backlight for a liquid crystal display device according to the present invention is arranged at the backside face of the liquid crystal display device for lighting the backside face and has a panel case provided with a flat panel section opposite to the backside face of the liquid crystal display device, plural phosphor-coated anodes each arranged flatly at the inner face of the flat panel section of the panel case and plural linear cathode sections each arranged immediately below each of the plural phosphor-coated anode sections in the panel case, wherein each of the plural linear cathode sections has a conductive wire arranged so as to extend linearly in the direction generally parallel to each of the plural phosphor-coated anode sections, a great number of field concentration assisting concave/convex sections formed on the outer peripheral surface of the conductive wire and a field electron emitter composed of a carbon-based film having a great number of sharp microscopic sections on the field concentration assisting concave/convex sections, wherein each field electron emitter of each of the plural linear cathode sections is provided so as to be capable of radially emitting electrons toward each of the plural phosphor-coated anode sections.

The process to the completion of the present invention is explained.

The present invention pays an attention to a field electron emission type fluorescent tube as an arc tube. Different from the cold cathode tube, the field electron emission type fluorescent tube has no rare gas or mercury vapor therein, that means it is in a vacuum state or in a generally vacuum state. Therefore, it has advantages of being environmentally friendly, being thin-sized capable of increasing the installation density since the tube wall is not heated, having high luminous efficiency and high luminous brightness, having a long service life to thereby obtain high reliability, or the like.

The inventor of the present invention pays attention to the excellent characteristics of the field electron emission type fluorescent tube described above, and has developed a field electron emission type fluorescent tube that can emit light with high intensity with more reduced power consumption than conventional one. The inventor of the present invention has therefore filed a patent application already as a result of the development (see Japanese Patent Application No. 2004-227781 filed on Aug. 4, 2004, titled "Field electron emission device, its manufacturing method and lighting device"). The present invention has developed and further applied the technique of the field electron emission type fluorescent tube disclosed in this patent application to a flat panel backlight.

In the aforesaid patent application, a field concentration is caused on the microscopic sharp sections of a carbon-based film when DC voltage is applied between the phosphor-coated anode section and the linear cathode section. Since the sharp sections are formed on the assisting concave/convex sections, the field concentration is more strongly caused. As a result, a gate electrode for drawing electrons from the carbon-based film is unnecessary, thereby making it possible to emit electrons only by two poles of anode and cathode at 5 to 10 kV. Further, there is no power consumed by the application of voltage to the gate electrode, thereby being capable of providing reduced power consumption and decreasing a size of the panel case. Moreover, it is unnecessary to provide the gate electrode, which leads to a simple structure.

A fluorescent lamp having an electron emission substance applied onto the outer periphery surface of the conductive wire has been proposed (see Japanese Unexamined Patent Application No. 2002-42735). In this fluorescent lamp disclosed in the application, field concentration assisting concave/convex sections are not formed on the outer periphery surface of the wire like the present invention, but only carbon-based fine grains are applied on the surface of the wire. Therefore, it is inferior in the field electron emission property to the present invention having a bipolar structure of an anode and a cathode due to the provision of the field concentration assisting concave/convex sections. Consequently, the fluorescent lamp in the aforesaid application requires a gate electrode for emitting electrons. The inventor of the present invention has confirmed that electron emission is insufficient without the gate electrode in the fluorescent lamp in the aforesaid application, so that it cannot obtain required luminous brightness.

The present invention has succeeded in the development of a backlight having more reduced power consumption and higher luminous brightness than the conventional backlight by using a technique of a field electron emission type fluorescent tube according to the application of the present inventor.

Specifically, the backlight for a liquid crystal display device of the present invention has a configuration of having a panel case provided with a flat panel section opposite to the backside face of the liquid crystal display device, plural phosphor-coated anode sections each arranged flatly at the inner face of the flat panel section of the panel case and plural linear cathode sections each arranged immediately below each of the plural phosphor-coated anode sections and arranged so as to extend linearly in the direction generally parallel to each of the plural phosphor-coated anode sections in the panel case, wherein each of the plural linear cathode sections has a conductive wire, a great number of field concentration assisting concave/convex sections formed on the outer peripheral surface of the conductive wire and a field electron emitter composed of a carbon-based film having a great number of sharp microscopic sections on the field concentration assisting concave/convex sections, wherein each field electron emitter of each of the plural linear cathode sections is provided so as to be capable of radially emitting electrons toward each of the plural phosphor-coated anode sections. Therefore, when DC voltage or high-frequency pulse voltage is applied between each of the plural phosphor-coated anode sections and each of the plural linear cathode sections, electrons are radially emitted from each field electron emitter of each of the plural linear cathode sections toward each of the plural phosphor-coated anode sections.

The backlight for a liquid crystal display device of the present invention can light the liquid crystal display device without a need for arranging plural arc tubes in lines or arranging a diffusion sheet or the like in order to eliminate luminous unevenness.

The above-mentioned "linear" is not limited to a straight line shape, but includes a curved line such as a spiral shape or wave-like shape, a shape wherein a curved line and straight line are mixed, and other shape. Further, it does not matter whether it has a solid-core or is hollow. Further, its sectional shape is not particularly limited. Specifically, its sectional shape is not limited to a circle, but may be an ellipse, rectangle or other shape. The above-mentioned "field concentration assigning concave/convex sections" include from field concentration assisting concave/convex sections each having a visible size made of projections or grooves to field concentration assisting concave/convex sections each having a microscopic size formed by surface roughness or the like. Its size does not matter. Further, the forming direction of the concave/convex sections may be a circumferential direction or longitudinal direction of the conductive wire. They can be made by spirally forming the concave/convex sections in the circumferential direction of the conductive wire. Further, they can be made by forming a great number of microscopic ribbed concave/convex sections in the longitudinal direction of the conductive wire. The carbon-based film includes a film made of carbon-nano material having a tube shape, wall shape or other shape. The shape having somewhat roundness can be included in the above-mentioned "sharp" shape so long as it has electron emission property.

In a preferable embodiment of the present invention, the plural phosphor-coated anode sections are integrally formed.

In a still preferable embodiment of the present invention, electron reflection surfaces curved in a concave manner are provided with respect to each of the plural linear cathode sections at the position opposite to each of the plural phosphor-coated anode sections, wherein each of the plural linear cathode sections is arranged at each focal position of the plural electron reflection surfaces.

In a still preferable embodiment of the present invention, the plural linear cathode sections are integrally formed by spirally bending a single conductive wire in the panel case.

In a still preferable embodiment of the present invention, the plural linear cathode sections are arranged such that plural conductive wires independent of each other are opposed to each of the plural phosphor-coated anode sections.

In a still preferable embodiment of the present invention, the carbon-based film is made of carbon nano-wall.

DETAILED DESCRIPTION OF THE PREFERRED EMBODIMENTS

Figure 1:
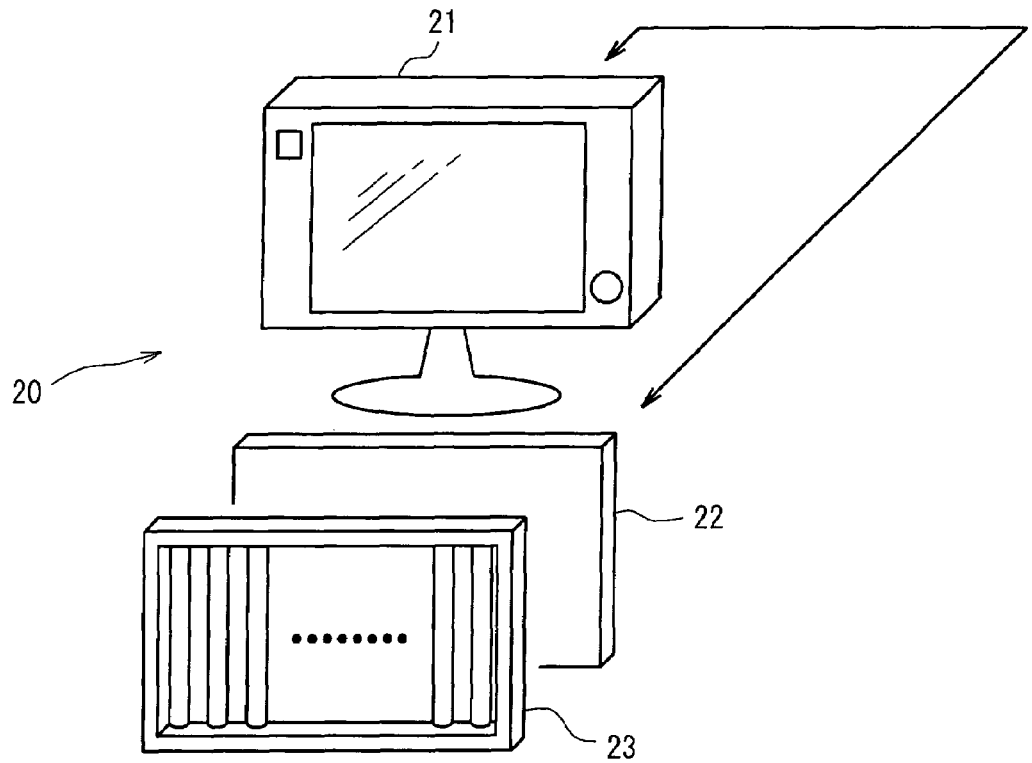
FIG. 1 is a perspective view showing that a liquid crystal display device and backlight are separated from a main body of a liquid crystal television set.
Figure 2:
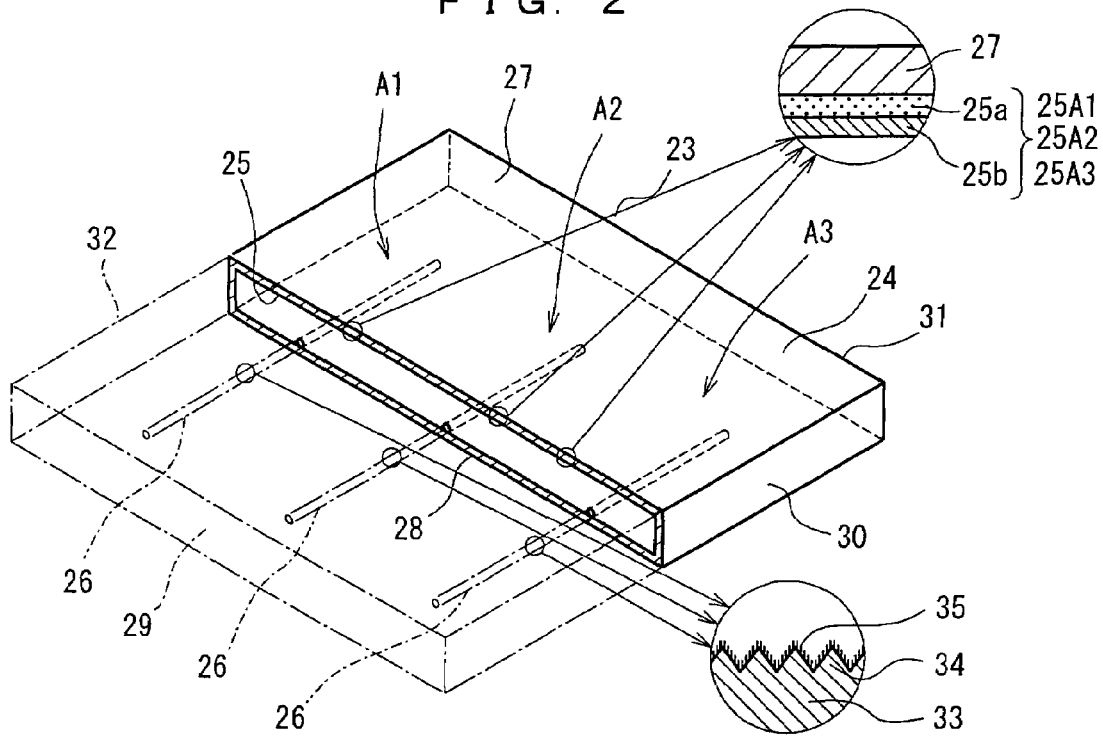
FIG. 2 is a partially cutaway perspective view of the backlight shown in FIG. 1.
Figure 3:
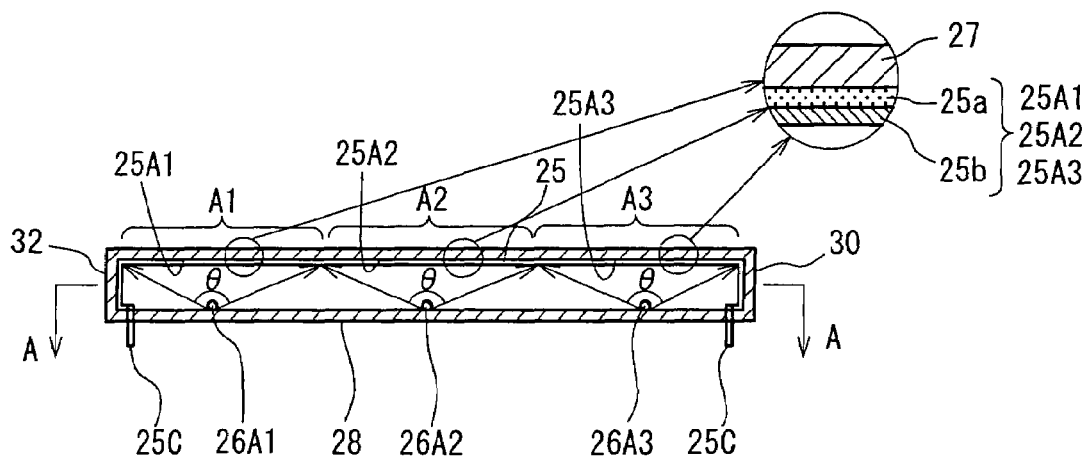
FIG. 3 is a side sectional view of the backlight shown in FIG. 2.
Figure 4:
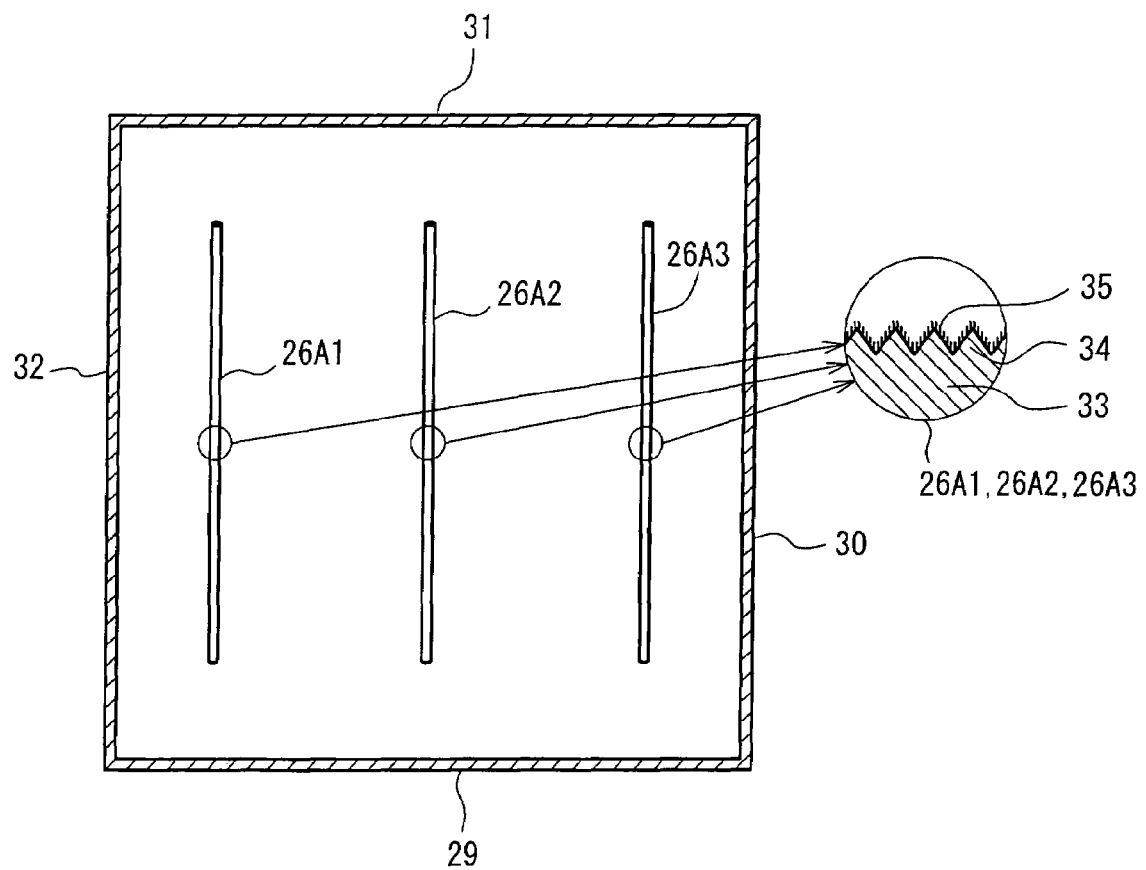
FIG. 4 is a plane sectional view taken along a line A-A in FIG. 3.

A backlight for a liquid crystal display device according to an embodiment of the present invention is explained in detail hereinafter with reference to the attached drawings.

With reference to FIGS. 1 to 5, numeral 20 denotes the entire liquid crystal television set. Numeral 21 denotes a liquid crystal television body, 22 a liquid crystal display device incorporated into the liquid crystal television body 21 and 23 a backlight according to the embodiment for lighting the backside of the liquid crystal display device 22.

The backlight 23 has a panel case 24, phosphor-coated anode section 25 and linear cathode sections 26.

The panel case 24 is encircled by a pair of opposing flat panel sections 27 and 28 and four side panel sections 29, 30, 31 and 32. The inside thereof is vacuum or generally vacuum. A technique for vacuum-pumping the inside of the panel case 24 or sealing the inside of the panel case 24 to be vacuum is well-known, so that its detailed explanation is omitted. One flat panel section 27 faces to the backside of the liquid crystal display device 22. This flat panel section 27 is divided into plural light-emitting sections, e.g., three light-emitting sections A1, A2 and A3 in the embodiment, for lighting the backside of the liquid crystal display device 22. The flat panel section 27 is made of a glass, preferably a soda lime glass. The other flat panel section 28 is on the backside with respect to the flat panel section 27. This flat panel section 28 and side panel sections 29, 30, 31 and 32 are made of the same glass as of the flat panel section 27 and formed integral with the flat panel section 27. The material for the flat panel case 24 is not limited to the glass. Any material is usable for the flat panel case 24 so long as it transmits emitted light so as to light the backside of the liquid crystal display device 22. A material excellent in light transmittance is preferable for the material for the panel case 24.

A phosphor-coated anode section 25 is formed at the inner face of the flat panel section 27. The phosphor-coated anode section 25 has at least a two-layer structure of a phosphor layer 25*a* and anode layer 25*b*. The phosphor layer 25*a* is applied on the inner face of the flat panel section 27. The anode layer 25*b* is deposited on the phosphor layer 25*a* by a vacuum deposition or sputtering method. An anode terminal 25*c* is for drawing the anode layer 25*b* of the phosphor-coated anode section 25 to the outside. The phosphor material of the phosphor layer 25*a* is not particularly limited. A material that can emit white light is preferable for the phosphor material of the phosphor layer 25*a*. An aluminum thin film is preferable for the material of the anode layer 25*b*. The material of the anode layer 25*b* is not limited to aluminum. The material of the anode layer 25*b* may be ITO (indium tin oxide) that is a transparent electrode. The ITO can be formed by, for example, a sputtering. The phosphor-coated anode section 25 is formed so as to be flatly widespread on the inner face of the flat panel section 27. The phosphor-coated anode section 25 is divided into plural light-emitting areas A1 to A3 at the inner face of the flat panel section 27.

The phosphor-coated anode section 25 can be divided into plural phosphor-coated anode sections 25A1, 25A2 and 25A3 with respect to the light-emitting areas A1, A2 and A3, whereby it is composed of these plural phosphor-coated anode sections 25A1, 25A2 and 25A3.

Linear cathode sections 26A1, 26A2 and 26A3 are provided at the inner face of the flat panel section 28 so as to correspond to each of the phosphor-coated anode sections 25A1, 25A2 and 25A3. Each of the linear cathode sections 26A1, 26A2 and 26A3 preferably has a conductive wire 33 made of nickel. The conductive wire 33 has a great number of concave/convex sections 34 formed on the outer peripheral surface. These concave/convex sections 34 are field concentration assisting concave/convex sections. A carbon-based film 35 is formed on these concave/convex sections 34. The carbon-based film 35 has a great number of sharp microscopic sections serving as a field electron emitter. The carbon-based film 35 is preferably made of carbon nano-wall, carbon nano-tube or other carbon nano-material. The concave/convex sections 34 include concave/convex sections each having a visible size formed by a screw-thread cutting. The concave/convex sections 34 include concave/convex sections each having a microscopic size formed by stretching the conductive wire 33. The concave/convex sections 34 include, for example, spiral concave/convex sections in the circumferential direction of the conductive wire 33. The concave/convex sections 34 include concave/convex sections along the longitudinal direction of the conductive wire 33. A technique for forming the concave/convex sections along the longitudinal direction of the conductive wire 33 include, for example, grinding the outer peripheral surface of the conductive wire 33 in the longitudinal direction by a grinder to roughen the surface to thereby form a great number of microscopic ribbed concave/convex sections. The concave/convex sections 34 are preferably aligned in the circumferential direction or longitudinal direction of the conductive wire 33 from the viewpoint of stabilization of the electron emission. The size, shape or number of the concave/convex sections 34 is not particularly limited. The conductive wire 33 may have conductivity. The conductive wire 33 is not limited to nickel.

The method for forming the carbon-based film 35 is not particularly limited. The carbon-based film 35 can be formed by, for example, screen printing, coating, CVD (chemical vapor deposition), electrodeposition or the like. When the carbon-based film 35 is made of carbon nano-tube, the carbon nano-tube has, for example, a tube shape with an outer diameter of 1 to several 10 nm and a length of 1 to several nm. An electric field is easy to be concentrated on its leading end due to this tube shape, so that it has a characteristic of easily emitting electrons. The carbon-based film 35 can be made of carbon nano-wall. The microscopic shape and structure of the carbon nano-tube or carbon nano-wall are well-known, so that they are not shown and not explained.

When DC voltage or high-frequency pulse voltage is applied between each of the linear cathode sections 26A1, 26A2 and 26A3 and each of the phosphor-coated anode sections 25A1, 25A2 and 25A3 (phosphor-coated anode section 25), electrons are emitted so as to be radially widespread at an emission angle θ from the carbon-based film 35, that is the field electron emitter, of each of the linear cathode sections 26A1, 26A2 and 26A3 toward the corresponding phosphor-coated anode sections 25A1, 25A2 and 25A3. Each of the linear cathode sections 26A1, 26A2 and 26A3 are arranged opposite to each of the phosphor-coated anode sections 25A1, 25A2 and 25A3 with a predetermined gap, wherein the gap may have a size to a degree to which the electrons emitted from the carbon-based film 35 of each of the linear cathode sections 26A1, 26A2 and 26A3 at the emission angle θ can cover each light-emitting area of each of the phosphor-coated anode sections 25A1, 25A2 and 25A3. Each of the linear cathode sections 26A1, 26A2 and 26A3 has a conductive wire independent of each other in the embodiment. In another embodiment, the conductive wire 33 of each of the linear cathode sections 26A1, 26A2 and 26A3 may be linearly arranged in a line. The conductive wire 33 of each of the linear cathode sections 26A1, 26A2 and 26A3 may be formed by meandering or bending a single conductive wire in the panel case 24.

When DC voltage is applied between each of the phosphor-coated anode sections 25A1, 25A2 and 25A3 and each of the linear cathode sections 26A1, 26A2 and 26A3, an electric field is strongly concentrated on the sharp sections of the carbon-based film 35 that is the field electron emitter of each of the linear cathode sections 26A1, 26A2 and 26A3, whereby electrons penetrate through energy barrier due to a quantum tunnel effect to thereby be emitted into vacuum. The emitted electrons are attracted by the corresponding phosphor-coated anode sections 25A1, 25A2 and 25A3 to collide with the same, by which the phosphor present at the light-emitting area of each of the phosphor-coated anode sections 25A1, 25A2 and 25A3 is excited to emit white light that is visible light.

Figure 5:
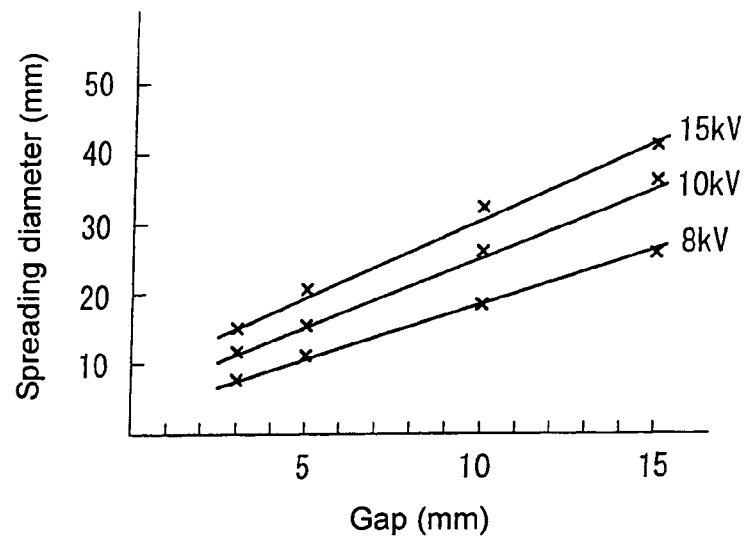
FIG. 5 is a view showing a characteristic of the backlight.

FIG. 5 shows a relationship between the gap (facing gap) between both flat panel sections 27, 28 represented by the axis of abscissa and a spreading diameter (mm) of the electrons emitted from the carbon-based film 35 that is the field electron emitter at an emission angle θ, represented by the axis of ordinate. FIG. 5 shows the relationship when DC voltage (kV) applied between the phosphor-coated anode sections 25A1, 25A2 and 25A3 and the linear cathode sections 26A1, 26A2 and 26A3 is 8 kV, 10 kV and 15 kV, respectively. FIG. 5 shows that the spreading diameter of the electrons is increased as the DC voltage is increased, even with the same gap.

The experiment by the present inventor is described hereinafter.

The flat size of the panel case 24 is 90 mm in both length and breadth, and the thickness of the case is 10 mm. The length of each linear cathode section 26A1, 26A2 and 26A3 is 60 mm. A voltage of 10 kV (frequency of 3 kHz) was applied from the pulse power source between each of the phosphor-coated anode sections 25A1, 25A2 and 25A3 and each of the linear cathode sections 26A1, 26A2 and 26A3. The luminous brightness of the backlight according to the embodiment was 70,000 cd/m$^2$ and the uniformity of the luminous brightness was more than 90% (measured points: 12 points) by this voltage application. Further, there was no deterioration in brightness after a long-period emission (720 hours) in the backlight of the embodiment. Moreover, there was no rise in the temperature at the surface of the panel case in the backlight of the embodiment.

Figure 6:
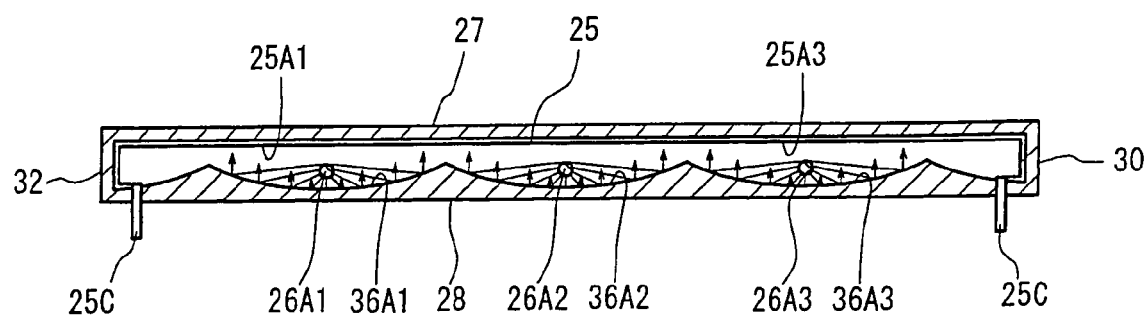
FIG. 6 is a view showing another modified example of the backlight.
Figure 7:
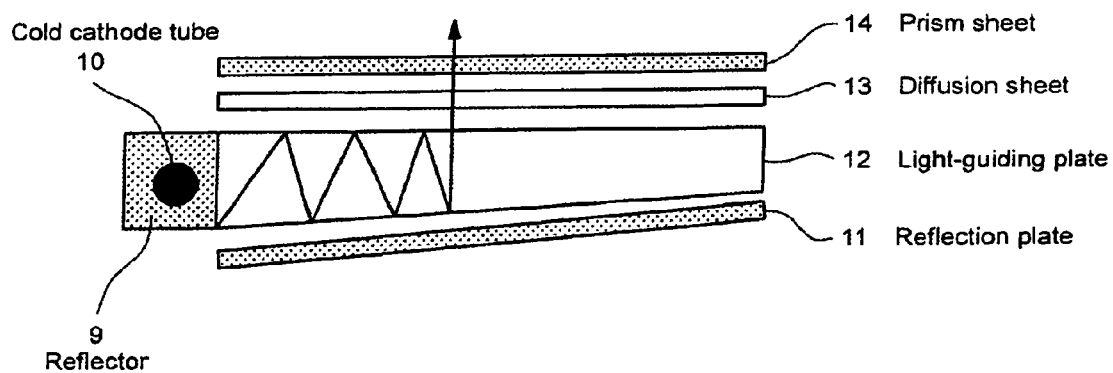
FIG. 7 is a schematic constructional view of a conventional edge-light type backlight.
Figure 8:
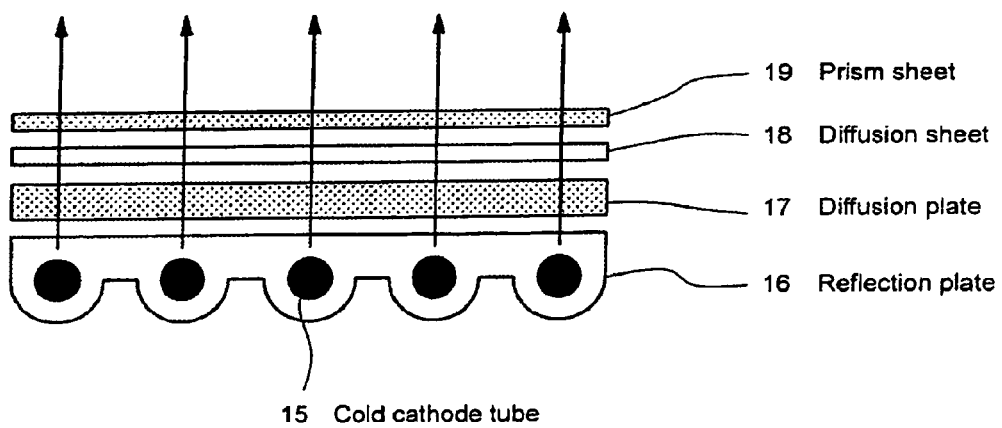
FIG. 8 is a schematic constructional view of a conventional directly-below type backlight.

It should be noted that, as shown in FIG. 6, electron reflection faces 36A1, 36A2 and 36A3 each being curved in a concave manner may be arranged at the position opposite to each of the phosphor-coated anode sections 25A1, 25A2 and 25A3 with respect to the linear cathode sections 26A1, 26A2 and 26A3, so that each of the linear cathode sections 26A1, 26A2 and 26A3 may be arranged at the focal position of each of the electron reflection faces 36A1, 36A2 and 36A3. Arranging the electron reflection faces 36A1, 36A2 and 36A3 allows the electrons, emitted from each of the linear cathode sections 26A1, 26A2 and 26A3 toward each direction of the electron reflection faces 36A1, 36A2 and 36A3, to be reflected in parallel toward each of the phosphor-coated anode sections 25A1, 25A2 and 25A3, with the result that more higher luminous brightness can be obtained. Further, a half outer peripheral surface, that opposes to the phosphor-coated anode sections 25A1, 25A2 and 25A3, of each conductive wire 33 of the linear cathode sections 26A1, 26A2 and 26A3 may be insulatingly covered and the field concentration assisting concave/convex sections may be formed on the remaining half outer peripheral surface. Forming the carbon-based film on the concave/convex sections makes it possible to reflect the electrons emitted from the half outer periphery of the conductive wire 33 of each of the linear cathode sections 26A1, 26A2 and 26A3 toward each of the electron reflection faces 36A1, 36A2 and 36A3 to thereby be directed toward each of the phosphor-coated anode sections 25A1, 25A2 and 25A3. Therefore, the size of the panel case can be further reduced.

What is claimed is:

1. A backlight for a liquid crystal display device that is arranged at the backside face of the liquid crystal display device for lighting the backside face, comprising:
   a panel case provided with a flat panel section opposite to the backside face of the liquid crystal display device;
   plural phosphor-coated anode sections each arranged flatly at the inner face of the flat panel section of the panel case; and
   plural linear cathode sections each arranged below each of the plural phosphor-coated anode sections in the panel case, wherein
   each of the plural linear cathode sections has a conductive wire arranged so as to extend linearly in the direction generally parallel to each of the plural phosphor-coated anode sections, metal field concentration assisting concave/convex sections formed on the outer peripheral surface of the conductive wire and a field electron emitter composed of a carbon-based film having sharp microscopic sections on the metal field concentration assisting concave/convex sections,
   each field electron emitter of each of the plural linear cathode sections is provided so as to be capable of radially emitting electrons toward each of the plural phosphor-coated anode sections.

2. A backlight for a liquid crystal display device of claim 1, wherein the plural phosphor-coated anode sections are integrally formed.

3. A backlight for a liquid crystal display device of claim 1 or 2, wherein electron reflection surfaces curved in a concave manner are provided with respect to each of the plural linear cathode sections at the position opposite to each of the plural phosphor-coated anode sections, and each of the plural linear cathode sections is arranged at each focal position of the plural electron reflection surfaces.

4. A backlight for a liquid crystal display device of claim 1 or 2, wherein the plural linear cathode sections are integrally formed by spirally bending a single conductive wire in the panel case.

5. A backlight for a liquid crystal display device of claim 1 or 2, wherein the plural linear cathode sections are arranged such that plural conductive wires independent of each other are opposed to each of the plural phosphor-coated anode sections.

6. A backlight for a liquid crystal display device of claim 1 or 2, wherein the carbon-based film is made of carbon nanowall.

* * * * *